United States Patent [19]
Wrobel et al.

[11] Patent Number: 5,703,741
[45] Date of Patent: Dec. 30, 1997

[54] BELT-DRIVEN TAPE CARTRIDGE WITH TAPE VIBRATION DAMPING PIN

[75] Inventors: Andrew Wrobel, La Jolla; Leonard C. Badour, San Diego, both of Calif.

[73] Assignee: Gigatek Memory Systems, La Costa, Calif.

[21] Appl. No.: 711,530

[22] Filed: Sep. 10, 1996

[51] Int. Cl.⁶ .................................................. G11B 23/02
[52] U.S. Cl. .................................................. 360/132
[58] Field of Search .................................................. 360/132

[56] References Cited

U.S. PATENT DOCUMENTS

| | | | |
|---|---|---|---|
| 4,688,742 | 8/1987 | Hettich | 242/192 |
| 5,204,796 | 4/1993 | Koizumi et al. | 360/132 |
| 5,448,440 | 9/1995 | Law et al. | 360/132 |

FOREIGN PATENT DOCUMENTS

| | | | |
|---|---|---|---|
| 0 584 751 A1 | 2/1994 | European Pat. Off. | 360/132 |
| WO 92/15989 | 9/1992 | WIPO | 360/132 |

*Primary Examiner*—John H. Wolff
*Attorney, Agent, or Firm*—Brown, Martin, Haller & McClain

[57] ABSTRACT

A belt-driven tape cartridge that includes at least one vibration damping pin. The cartridge comprises a base plate, two spools and various tape path members, such as roller guides, tension pins, and the like. The vibration damping pin is mounted on the base plate along an otherwise uninterrupted tape run between two tape path members. A characteristic of the damping pin that distinguishes it from other tape path members is that it does not alter the direction of the tape path significantly (if at all), i.e., any wrap angle is minimal; its sole function is to stabilize the tape. Furthermore, the wrap angle remains constant during operation. In embodiments including more than one damping pin, the pins may be distributed on both sides of the tape or all on the same.

24 Claims, 2 Drawing Sheets

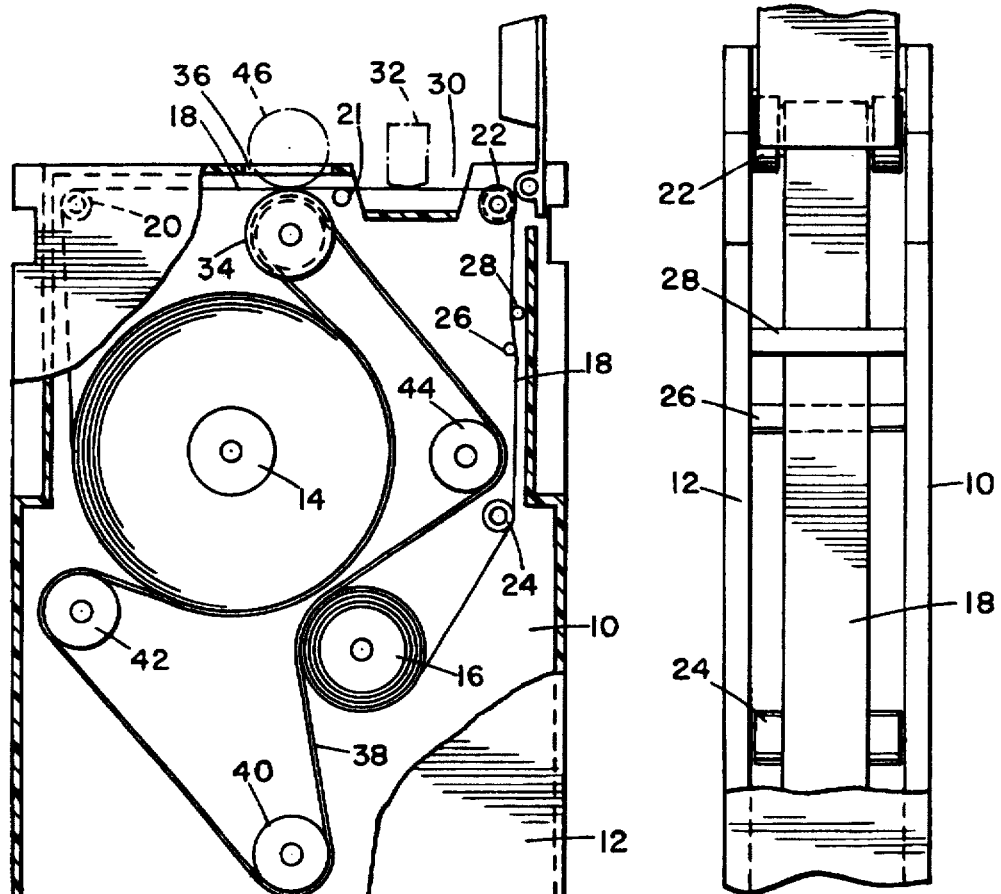
FIG. 1
FIG. 2
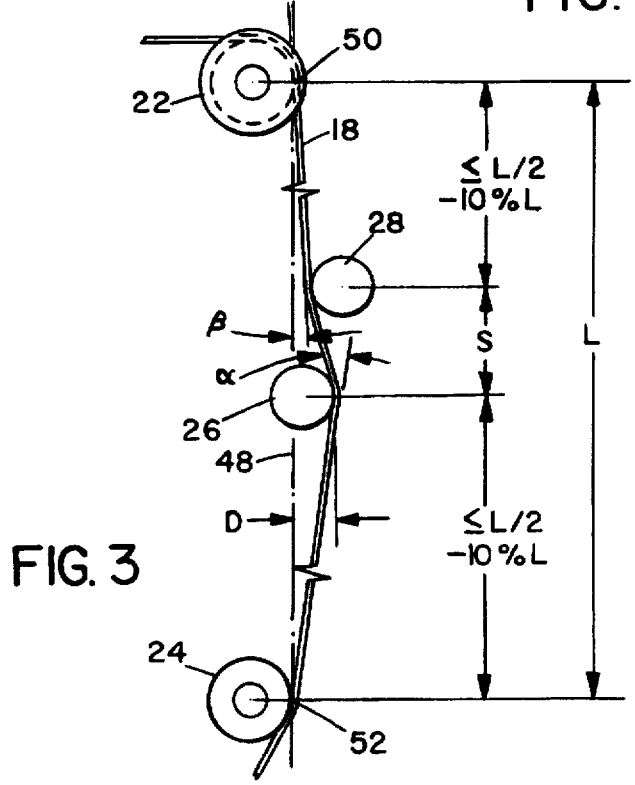
FIG. 3

BELT-DRIVEN TAPE CARTRIDGE WITH TAPE VIBRATION DAMPING PIN

BACKGROUND OF THE INVENTION

1. Field of the Invention

The present invention relates generally to magnetic tape data storage media for computer systems and, more specifically, to an improvement in guide pin arrangements in tape cartridges.

2. Description of the Related Art

The belt-driven tape cartridge described in U.S. Pat. No. 3,692,255, issued to Von Behren, is used in conjunction with a tape drive unit to store and retrieve data in a computer system. The cartridge includes a rectangular metal base plate, two spools rotatably mounted on pins perpendicular to the base plate, and a plastic cover. A belt extending around a capstan and the spools rotates the spools in response to rotation of the capstan by the tape drive roller. The two spools are arranged side-by-side at approximately equal distances from the front of the cartridge housing, and the tape path extends from one spool to the other along a path generally parallel to the front of the cartridge. The front of the cartridge has a door that opens during operation to expose the tape to the tape head of the tape drive. Standards, such as ANSI specification X3.55–1977, have evolved to promote compatibility among the cartridges and drives produced by different manufacturers.

Practitioners in the art have improved upon the Von Behren concept. Storage capacity has been increased by increasing the data density, the length of tape in the cartridge and the tape width. Tape speeds are also much higher than in the original Von Behren cartridge.

Belt-driven tape cartridges may include various tape guides and tension pins. These tape path members alter the angular direction of the tape by allowing the tape to wrap around them. The extent to which the angular direction of the tape is altered is known as the wrap angle of that tape path member. The wrap angle of a spool changes during operation as its diameter changes with the amount of tape wound on it. The wrap angles of certain tape path members also change as the amount of tape wound on the spools changes during operation. The wrap angle on other tape path members may remain constant. U.S. Pat. No. 4,221,348, issued to Moeller, describes a cartridge having two pins that promote a constant tape tension because the frictional contact area between them and the tape increases as the wrap angle increases. Maintaining a constant tape tension is crucial to reliable operation at high data densities.

As described in U.S. Pat. No. 4,262,860, issued to Hurtig et al., extended length belt-driven tape cartridges that hold a longer length of tape than standard belt-driven tape cartridges but can be used in a standard tape drive have been developed. Such cartridges may have a greater housing length, i.e., distance between the front and rear edges, than a standard cartridge but the same width, i.e., distance between side edges, as a standard rectangular belt-driven cartridge so that they can fit in the tape door of a standard drive. The two spools of an extended length cartridge are arranged with one spool closer to the front of the cartridge than the other. By arranging the spools in this manner, the cartridge can accommodate a spool having the larger diameter that results from the longer length of tape wound on it.

The distance between tape path members, such as tension pins and tape guides, in an extended length cartridge may be longer than the distance between such members in a standard cartridge, due to the arrangement of the spools. At high tape speeds, the tape may flutter or vibrate at points on the tape path between relatively widely spaced tape path members. Such vibration causes perturbations in tape tension that may misalign the tape with respect to the tape head. To a lesser extent, tape vibration may also occur in standard size cartridges.

It would be desirable to provide a cartridge that inhibits vibration of the tape between relatively widely spaced tape path members. These problems and deficiencies are clearly felt in the art and are solved by the present invention in the manner described below.

SUMMARY OF THE INVENTION

The present invention is a belt-driven tape cartridge that includes at least one vibration damping pin. The cartridge comprises a base plate, two spools and a plurality of tape path members of the conventional types known in belt-driven tape cartridges, such as roller guides, tension pins, and the like.

The vibration damping pin is fixedly mounted on the base plate and disposed generally along an otherwise uninterrupted tape run between two tape path members. When the tape is static, i.e., the cartridge is not in operation, the damping pin may be in contact with the tape or the damping pin may be spaced from it. If the tape vibrates during operation, the proximity of the damping pin limits the tape vibration amplitude.

A characteristic of the damping pin that distinguishes it from other tape path members is that it does not alter the direction of the tape path significantly (if at all); its sole function is to stabilize the tape. In embodiments in which the static tape contacts the damping pin, the wrap angle is minimal or zero. In embodiments in which the static tape is not in contact with the damping pin, the wrap angle is defined as being zero. Furthermore, at all times, both when the tape is moving during operation and when the tape is static during non-operation, the wrap angle remains at a constant value. In embodiments including more than one damping pin, the pins may be distributed on both sides of the tape or all on the same side.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 is a top plan view, partially cut-away, of a belt-driven tape cartridge, showing the vibration damping pins;

FIG. 2 is a side elevation view of the side of cartridge of FIG. 1;

FIG. 3 is a diagrammatic view illustrating the arrangement of damping pins in the tape path;

DESCRIPTION OF PREFERRED EMBODIMENTS

Figure 4:
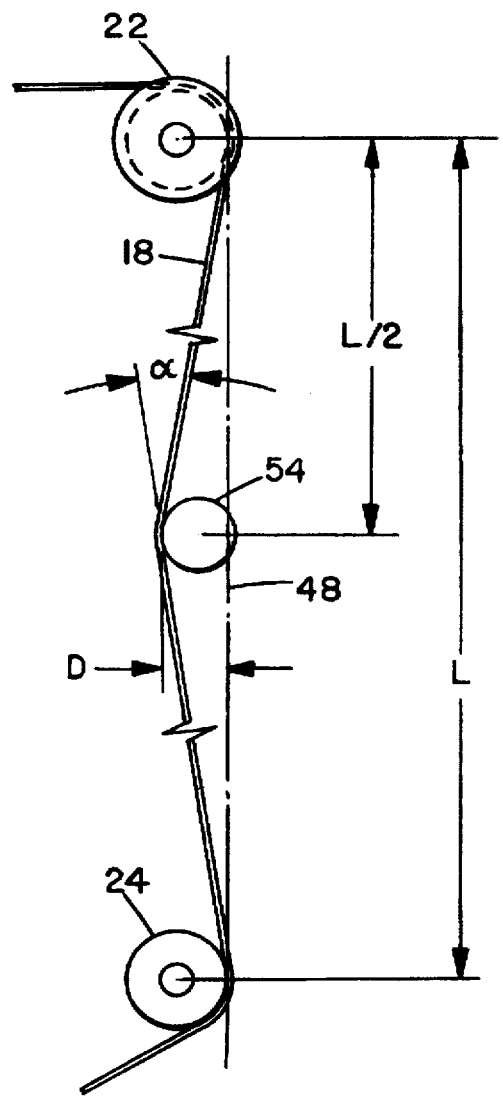
FIG. 4 is a diagrammatic view illustrating an alternative arrangement of a damping pin in the tape path.

As illustrated in FIGS. 1–3, an extended length data cartridge comprises a metal base plate 10, a transparent plastic cover 12, and two tape spools 14 and 16. Spools 14 and 16 are rotatably mounted on the base plate 10. A magnetic recording tape 18 is wound around spools 14 and 16 at opposite ends and extends between spools 14 and 16 along a predetermined path around tape path members consisting of tape guides 20, 21, 22 and 24 and vibration damping pins 26 and 28. These tape path members are fixedly mounted perpendicularly in base plate 10. The tape path extends across a tape head opening 30 in the front wall of the cartridge to provide access for a tape head 32. A drive roller 34 is mounted adjacent a drive opening 36 in the front wall of the cartridge. A drive belt 38 extends around drive roller 34 and around belt guides 40, 42 and 44 fixedly mounted on base plate 10. In operation, the capstan 46 of the tape drive (not shown) frictionally rotates drive roller 34 through drive opening 36 in the front wall of the housing. Roller 34 rotates belt 38, which in turn, rotates spools 14 and 16, thereby moving tape 18 head 32. Guide 21 prevents tape 18 from contacting drive roller 34 when head 32 engages tape 18 during operation. But for the existence of damping pins 26 and 28, the cartridge is essentially as described in U.S. Pat. No. 4,262,860, issued to Hurtig et al.

With reference to FIG. 3 (not to scale), vibration damping pins 26 and 28 are disposed in the tape path between shouldered guides 22 and 24. Pins 26 and 28 are preferably without shoulders. Pins 26 and 28 are preferably made of polished stainless steel to minimize friction. Although pins 26 and 28 contact tape 18, they do not protrude into the tape path to nearly the same extent as other tape path members because their purpose is to damp vibration rather than to alter the tape direction or control tape tension. Preferably, the points on the length of tape 18 between guides 22 and 24 in contact with pins 26 and 28 do not deviate laterally more than 0.005 inches from the line 48 connecting the respective tape run tangent points 50 and 52, i.e., the two closest points on guides 22 and 24, respectively, at which tape 18 contacts them. (The portion of line 48 between tape run tangent points 50 and 52 thus represents the "direct tape run" along which tape 18 would extend linearly but for the presence of pins 26 and 28.) The length of the direct tape run is labeled "L" in FIG. 3. Although this deviation ("D") from line 48 is preferably no more than 0.005 inches, any deviation ("D") between zero and 0.020 inches is suitable. It should be noted that, although pins 26 and 28 are preferably in contact with tape 18, in other embodiments the damping pin or pins may be spaced from the direct tape run by the deviation ("D").

Vibration damping pins 26 and 28 are preferably generally centrally disposed between guides 22 and 24 along line 48. Because damping pins 26 and 28 cannot, of course, both be located precisely at the midpoint of the direct tape run, they may be disposed within a longitudinal distance from this midpoint equal to approximately 10 percent of the direct tape run distance ("L"). They may be located at any lateral distance from line 48 that satisfies the requirements described above with respect to the deviation ("D").

Pins 26 and 28 are preferably spaced closely together to enhance vibration damping. The distance ("S") between their centers is preferably no more than approximately 20% of the direct tape run distance ("L"). Although in other embodiments having multiple damping pins, the damping pins may be more widely separated, each damping pin is preferably spaced within this maximum distance of at least one other damping pin. In addition, although pins 26 and 28 are preferably disposed on opposite sides of tape 18 to enhance vibration damping, in other embodiments the vibration damping pins may be disposed only on one side of tape 18. In such embodiments, it is preferred to dispose those pins on the side of tape 18 that is not coated with magnetic material to prevent abrading the coating. In the illustrated embodiment, pin 26 contacts that side of tape 18.

Although the present invention may be used in any type of belt-driven tape cartridge, it provides significant damping in cartridges in which the direct tape run distance ("L") is at least approximately 2.0 inches. In an extended length tape cartridge of the type illustrated, the present invention provides significant damping where the direct tape run distance ("L") is at least approximately one-third of the length of the cartridge housing.

Although a plurality of vibration damping pins are preferred, a cartridge may have only a single vibration damping pin. If only a single pin is included, it is preferably disposed on the side of tape 18 that is not coated with a magnetically permeable material.

Pins 26 and 28 have wrap angles $\alpha$ and $\beta$, respectively. The wrap angle of pins 26 and 28 is the angular change in direction they cause in tape 18. As used herein, the term "wrap angle" includes the zero angle that results when the tape is spaced from the tape by a distance of zero or greater and thus does not "wrap" around the pin at all. The wrap angles $\alpha$ and $\beta$ of pins 26 and 28, respectively, preferably do not exceed 15 degrees.

In operation, pins 26 and 28 contact tape 18, which is typically moving at 30 inches per second, thereby damping tape vibration or flutter that may occur in their absence. Tape vibration and the physical mechanism by which pins 26 and 28 damp it are not well-understood, but it is believed that the vibration may be characterized as a standing wave in the length of tape between guides 22 and 24, and that pins 26 and 28 may limit the amplitude of the standing wave.

It should be noted that the wrap angles $\alpha$ and $\beta$ of pins 26 and 28, respectively, remain constant regardless of changes in the relative amount of tape wound on spools 14 and 16 and regardless of whether tape head 32 is in contact with tape 18. This property may be contrasted with guides 20 and 24, which have wrap angles that vary with changes in the relative amount of tape wound on spools 14 and 16, and with guide 21, which has a wrap angle that changes when tape head 32 engages or disengages tape 18. Furthermore, it should be noted that the wrap angles with which the present invention is concerned do not change in response to tape vibration. To the extent that tape vibration induces lateral movement of the tape where it contacts a damping pin, such movement does not affect the wrap angle, as defined herein.

As illustrated in FIG. 4 (not to scale), in an alternative embodiment only a single damping pin 54 may be disposed in the tape path between guides 22 and 24. As in the embodiment described above with respect to FIGS. 1–3, the point on the length of tape 18 between guides 22 and 24 in contact with pin 54 does not deviate laterally more than 0.005 inches from line 48, although any deviation ("D") between zero and 0.020 inches is suitable. Pin 54 is preferably generally centrally disposed between guides 22 and 24, although it may be disposed within a longitudinal distance from this midpoint equal to approximately 10 percent of the direct tape run distance ("L"). It should be noted that in this embodiment, pin 54 contacts the side of tape 18 having the magnetically permeable coating. As in the embodiment described above with respect to FIGS. 1–3, it should be noted that the wrap angle a does not change at any time during operation of the cartridge. The wrap angle $\alpha$ preferably does not exceed 15 degrees.

Figure 5:
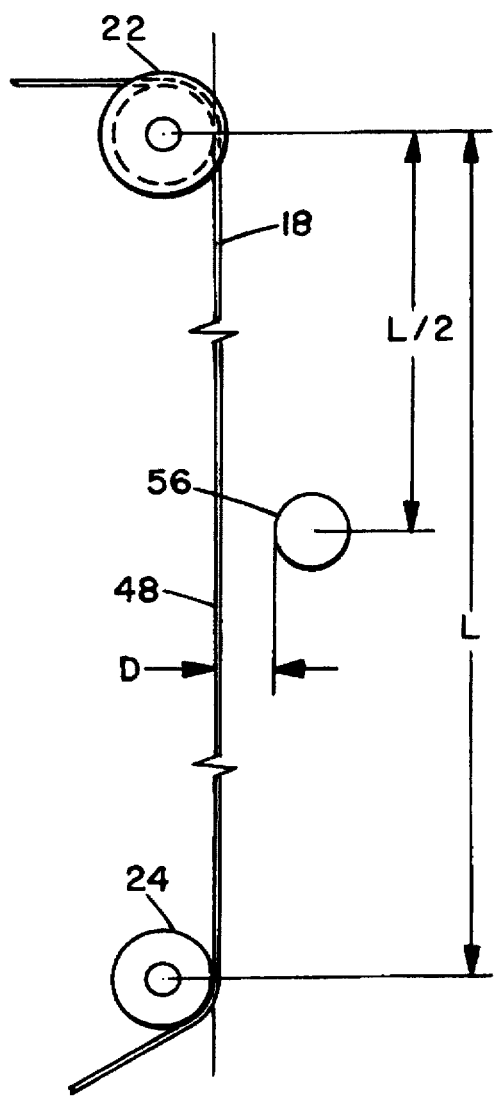
FIG. 5 is a diagrammatic view illustrating another alternative arrangement of a damping pin in the tape path.

As illustrated in FIG. 5 (not to scale), in another alternative embodiment a damping pin 56 is disposed in the tape path between guides 22 and 24. Unlike in the embodiments described above, no point on the length of tape 18 between guides 22 and 24 is in contact with pin 56 in the static state of the cartridge, i.e., when tape 18 is not moving. Nevertheless, if tape 18 begins to vibrate during operation of the cartridge, its vibration is limited in amplitude by the spacing between it and pin 56. Contact between tape 18 and pin 56 thus damps the vibration, in a manner similar to the embodiments described above in which tape 18 is constantly in contact with a damping pin. It is preferred that tape 18 not contact pin 56 at any point deviating laterally more than 0.005 inches from line 48, although any deviation ("D") between zero and 0.020 inches is suitable. As in the embodiments described above, pin 56 is preferably centrally disposed between guides 22 and 24, although it may be disposed within a distance from this midpoint equal to approximately 10 percent of the direct tape run distance ("L"). It should be noted that the wrap angle in this embodiment, denoted $\alpha$ in the other embodiments described above, does not change at any time during operation of the cartridge in this embodiment because it remains at zero.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. An improvement in a tape cartridge having a base plate, a plurality of tape path members mounted on a surface of said base plate, two spools rotatably mounted on said surface of said base plate, a plurality of belt guides, a flexible belt extending around said belt guides, and a magnetic tape threadably extending around said tape path members between said spools, the improvement comprising:

a damping pin disposed generally along a length of tape between a pair of said tape path members and fixedly mounted to said base plate perpendicularly to said surface;

said damping pin at all times having a constant wrap angle with respect to said tape; and said damping pin at no time contacting said tape at a line deviating more than 0.020 inches from a direct tape run between said pair of tape path members in a direction perpendicular to said direct tape run.

2. The improvement in a tape cartridge recited in claim 1, wherein said length of tape between said pair of tape path members is at least 2.0 inches.

3. The improvement in a tape cartridge recited in claim 1, wherein said damping pin is disposed at a distance from a midpoint of said direct tape run that is not greater than 10% of said direct tape run.

4. The improvement in a tape cartridge recited in claim 1, wherein said damping pin is not in contact with said tape when said tape is static.

5. The improvement in a tape cartridge recited in claim 1, wherein said damping pin is in contact with said tape when said tape is static.

6. The improvement in a tape cartridge recited in claim 5, wherein said damping pin contacts an uncoated side of said tape.

7. An improvement in a tape cartridge having a base plate, a plurality of tape path members mounted on a surface of said base plate, two spools rotatably mounted on said surface of said base plate, a plurality of belt guides, a flexible belt extending around said belt guides, and a magnetic tape threadably extending around said tape path members between said spools, the improvement comprising:

a plurality of damping pins disposed generally along a length of tape between a pair of said tape path members and fixedly mounted to said base plate perpendicularly to said surface; and said plurality of damping pins at all times having constant wrap angles with respect to said tape.

8. The improvement in a tape cartridge recited in claim 7, wherein said wrap angles do not exceed 15 degrees.

9. The improvement in a tape cartridge recited in claim 7, wherein each damping pin along a direct tape run between said pair of tape path members is within a distance from at least one other damping pin equal to not less than approximately 20% of said direct tape run.

10. The improvement in a tape cartridge recited in claim 7, wherein said plurality of damping pins includes a first damping pin disposed on a first side of said tape and a second damping pin disposed on a second side of said tape.

11. The improvement in a tape cartridge recited in claim 7, wherein said damping pin at no time contacts said tape at a line deviating more than 0.020 inches from a direct tape run between said pair of tape path members in a direction perpendicular to said direct tape run.

12. The improvement in a tape cartridge recited in claim 7, wherein a direct tape run between said pair of tape path members is at least 2.0 inches.

13. The improvement in a tape cartridge recited in claim 7, wherein each said damping pin is disposed at a distance from a midpoint of a direct tape run between said pair of tape path members that is not greater than 10% of said direct tape run.

14. An improvement in a tape cartridge having a base plate, a plurality of tape path members mounted on a surface of said base plate, two spools rotatably mounted on said surface of said base plate, a plurality of belt guides, a flexible belt extending around said belt guides, and a magnetic tape threadably extending around said tape path members between said spools, the improvement comprising:

a damping pin disposed generally along a length of tape of at least 2.0 inches between a pair of said tape path members and fixedly mounted to said base plate perpendicularly to said surface;

said damping pin at all times having a constant wrap angle with respect to said tape.

15. The improvement in a tape cartridge recited in claim 14, wherein said damping pin at no time contacts said tape at a line deviating more than 0.020 inches from a direct tape run between said pair of tape path members in a direction perpendicular to said direct tape run.

16. The improvement in a tape cartridge recited in claim 14, wherein said damping pin is disposed at a distance from a midpoint of a direct tape run between said pair of tape path members that is not greater than 10% of said direct tape run.

17. The improvement in a tape cartridge recited in claim 14, wherein said damping pin is not in contact with said tape when said tape is static.

18. The improvement in a tape cartridge recited in claim 14, wherein said damping pin is in contact with said tape when said tape is static.

19. The improvement in a tape cartridge recited in claim 18, wherein said damping pin contacts an uncoated side of said tape.

20. An improvement in a tape cartridge having a base plate, a plurality of tape path members mounted on a surface of said base plate, two spools rotatably mounted on said surface of said base plate, a plurality of belt guides, a flexible belt extending around said belt guides, and a magnetic tape threadably extending around said tape path members between said spools, the improvement comprising:

a damping pin disposed generally along a length of tape between a pair of said tape path members and fixedly mounted to said base plate perpendicularly to said surface;

said damping pin at all times having a constant wrap angle with respect to said tape not exceeding 15 degrees.

21. The improvement in a tape cartridge recited in claim 20, wherein said length of tape between said pair of tape path members is at least 2.0 inches.

22. The improvement in a tape cartridge recited in claim 20, wherein said damping pin is disposed at a distance from a midpoint of said direct tape run that is not greater than 10% of said direct tape run.

23. The improvement in a tape cartridge recited in claim 20, wherein said damping pin is not in contact with said tape when said tape is static.

24. The improvement in a tape cartridge recited in claim 20, wherein said damping pin is in contact with said tape when said tape is static.

* * * * *